United States Patent [19]

Huber et al.

[11] Patent Number: 4,860,615
[45] Date of Patent: Aug. 29, 1989

[54] REVERSIBLE TRANSMISSION

[75] Inventors: Thomas V Huber, Franklin; Ronald D. Hone, Fairview, both of Tenn.

[73] Assignee: DNE Corporation, Brentwood, Tenn.

[21] Appl. No.: 119,661

[22] Filed: Nov. 12, 1987

[51] Int. Cl.$^4$ ............................................. F16H 3/44
[52] U.S. Cl. ...................................................... 74/785
[58] Field of Search ......................................... 74/785

[56] References Cited

U.S. PATENT DOCUMENTS

| | | | |
|---|---|---|---|
| 2,540,965 | 2/1951 | Schellinger | 74/785 X |
| 3,069,929 | 12/1962 | Hansen | 74/785 |
| 3,365,985 | 1/1968 | Johnson | 74/785 X |
| 4,567,788 | 2/1986 | Miller | 74/789 |
| 4,649,773 | 5/1987 | Svab | 74/785 X |
| 4,688,664 | 8/1987 | Miller | 192/18 A |

FOREIGN PATENT DOCUMENTS

| | | | |
|---|---|---|---|
| 95341 | 12/1923 | Fed. Rep. of Germany | 74/785 |
| 891041 | 3/1962 | United Kingdom | 74/785 |
| 2102515 | 2/1983 | United Kingdom | 74/785 |

*Primary Examiner*—Dirk Wright
*Attorney, Agent, or Firm*—Luedeka, Hodges & Neely

[57] ABSTRACT

A reversible transmission for a motor vehicle, more particularly for use in a boat, operates in a forward drive mode, reverse drive mode, and neutral mode. The reversible transmission has a housing with a rotatably mounted driving or input shaft and a rotatably mounted driven or output shaft. A planetary gear device is used to transmit power from the driving shaft to the driven shaft. When the transmission is in the forward drive mode, a planetary ring gear of the planetary gear device is interconnected with the driving shaft by engagement of a first clutch to cause the planetary gear carrier of the planetary gear device to rotate with the driving shaft in the same angular direction thereby rotating the driven shaft in the same angular direction. When the transmission is in the reverse drive mode, the planetary ring gear is interconnected with the transmission housing by engagement of a second clutch to fix the ring gear against rotation and the first clutch is disengaged disconnecting the ring gear from the driving shaft causing the planetary gear carrier to rotate in the opposite angular direction to the driving shaft thereby rotating the driven shaft in the opposite angular direction to the driving shaft. When the transmission is in the neutral mode, both the first and second clutches are disengaged.

16 Claims, 5 Drawing Sheets

REVERSIBLE TRANSMISSION

The present invention relates generally to transmissions used in motor vehicles to transmit power from the prime mover of the vehicle, and more particularly to a reversible transmission unit for boats.

Transmissions are typically used in boats to shift between forward and reverse drives, and they usually also provide a neutral position where the motor is disconnected from the propeller. Some boat transmissions utilize bulky and complex hydraulic systems within the transmission to achieve a desired shift of drive modes, and complicated sealing systems are needed to maintain the integrity of the hydraulic system. Typically, many parts of such hydraulic systems are rotating with respect to the housing and other sections of the transmission and, thus, the sealing system becomes complex. Also, when parts of a hydraulic system are rotating, the fluid is also rotated and subjected to centrifugal force, and this force may create hydraulic pressure sufficient to accidentally actuate a clutch piston or other part of the system.

The boat transmission of the present invention avoids problems of known prior boat transmissions by providing a transmission in which a sun gear is constantly engaged with planet gear pairs which are constantly engaged with a ring gear. Two clutches are used to selectively lock the ring gear to either the housing or the drive shaft and, thus, to achieve a shift between forward and reverse drives. A hydraulic system is disposed and held in a stationary position with respect to the housing and it includes two pistons that actuate the clutches. The stationary nature of the hydraulic system eliminates or avoids the problems associated with hydraulic systems that have rotating elements. In the preferred mode, at least one roller bearing is provided between one of the pistons and one of the clutches since one of the clutches is required to rotate with respect to the stationary pistons of the hydraulic system.

It is an object of the present invention to provide a transmission wherein all of the transmission gears are in constant mesh.

It is another object of the invention to provide a transmission device having two clutches for controlling the forward and reverse modes wherein when one clutch engages the other clutch concurrently disengages.

Yet another object of the invention is to provide a transmission device having a stationary pressure mechanism mounted and held in a fixed position in the transmission housing for selectively applying pressure to either one of two clutch means to thereby selectively operate the transmission in either one of two drive modes.

Other objects and advantages of the invention will become known by reference to the following description and drawings in which:

The illustrated embodiment, in general, provides a power transmission device particularly adaptable for use in a boat having a forward mode, reverse mode, and neutral mode. The transmission comprises a housing with a driven or output shaft projecting from one end, and a driving or input shaft projecting from the other end. A driving sun gear is coaxially mounted to the driving shaft for rotation therewith. A planetary gear train having a plurality of planetary gears located in a planet gear carrier is coaxially located with the driving sun gear with some of the planetary gears in mesh with the sun gear, and with the planet gear carrier mounted to the driven shaft for rotation therewith. A ring gear is concentrically located with the planet gear carrier with others of the planetary gears in mesh with the ring gear. A first clutch is used to selectively couple and uncouple the ring gear to the driving shaft, and a second clutch is used to selectively couple and uncouple the ring gear to the transmission housing. The first and second clutches are activated concurrently so that when the first clutch is activated coupling the ring gear to the driving shaft, the second clutch is de-activated, uncoupling the ring gear from the transmission housing, and so that when the first clutch is de-activated uncoupling the ring gear from the driving shaft, the second clutch is activated coupling the ring gear to the transmission housing. A first fluid actuated piston is used to activate the first clutch, and a second fluid actuated piston is used to activate the second clutch. The first and second fluid actuated pistons are each mounted and held in a stationary position within the housing and function as a pressure plate or mechanism for selectively engaging one of the clutches. In the preferred embodiment, a ring protruding from the first piston functions to engage a clutch and it also forms part of a second cylinder for the second piston. When the second cylinder is pressurized, the first piston is urged away from the first clutch and the second piston is urged toward the second clutch.

Figure 1:
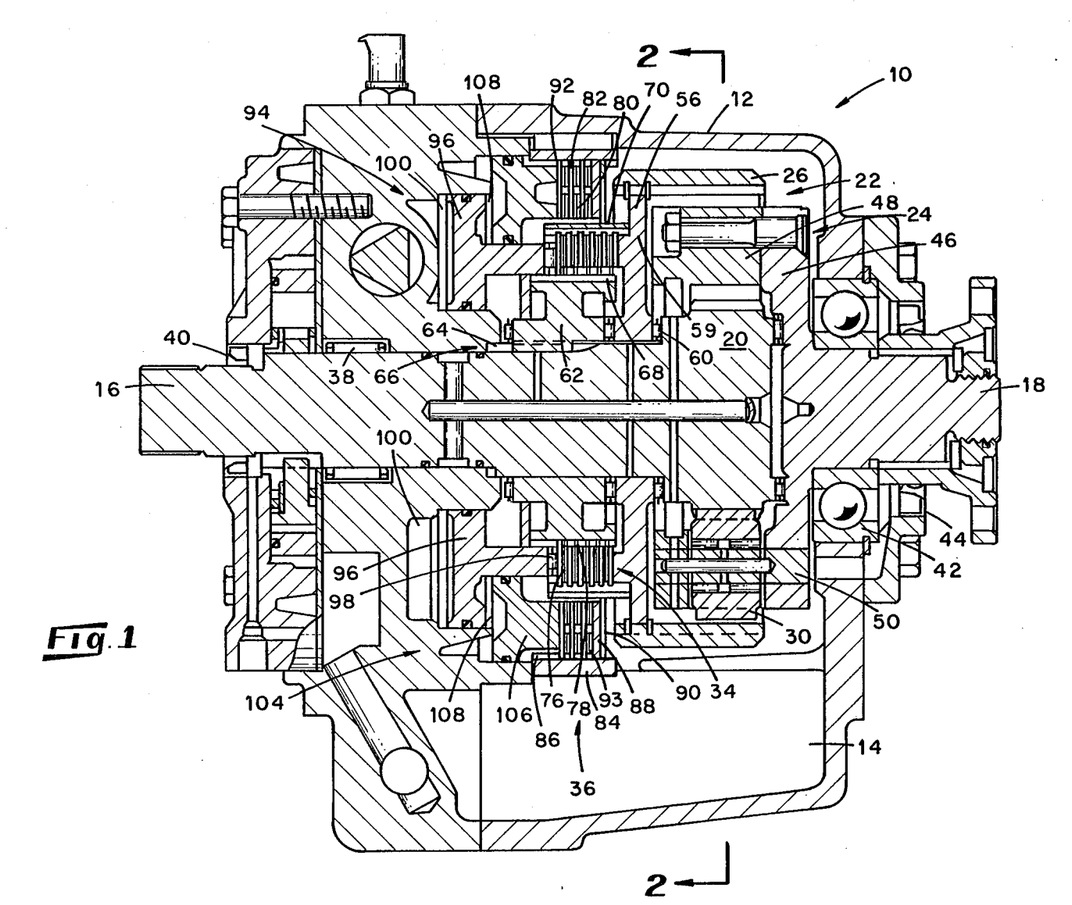
FIG. 1 is a cross-sectional side view of a transmission embodying various features of the present invention with the transmission in the forward driving mode of operation.
Figure 2:
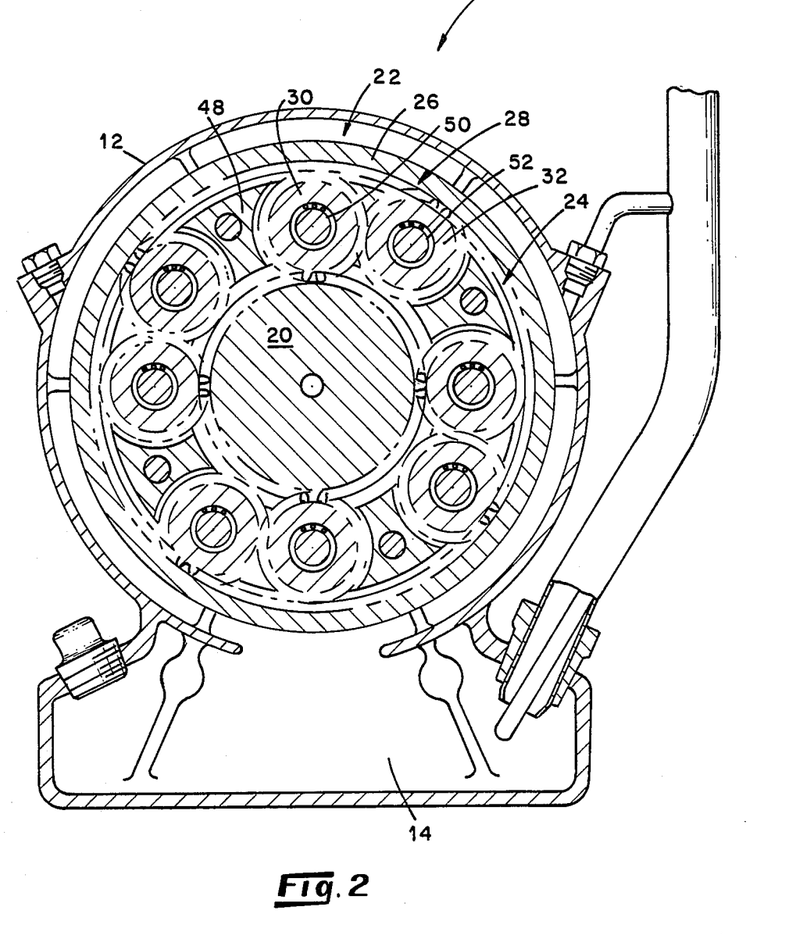
FIG. 2 is a rear cross-sectional view of the transmission as seen in the direction of arrows 2—2 in FIG. 1.
Figure 3:
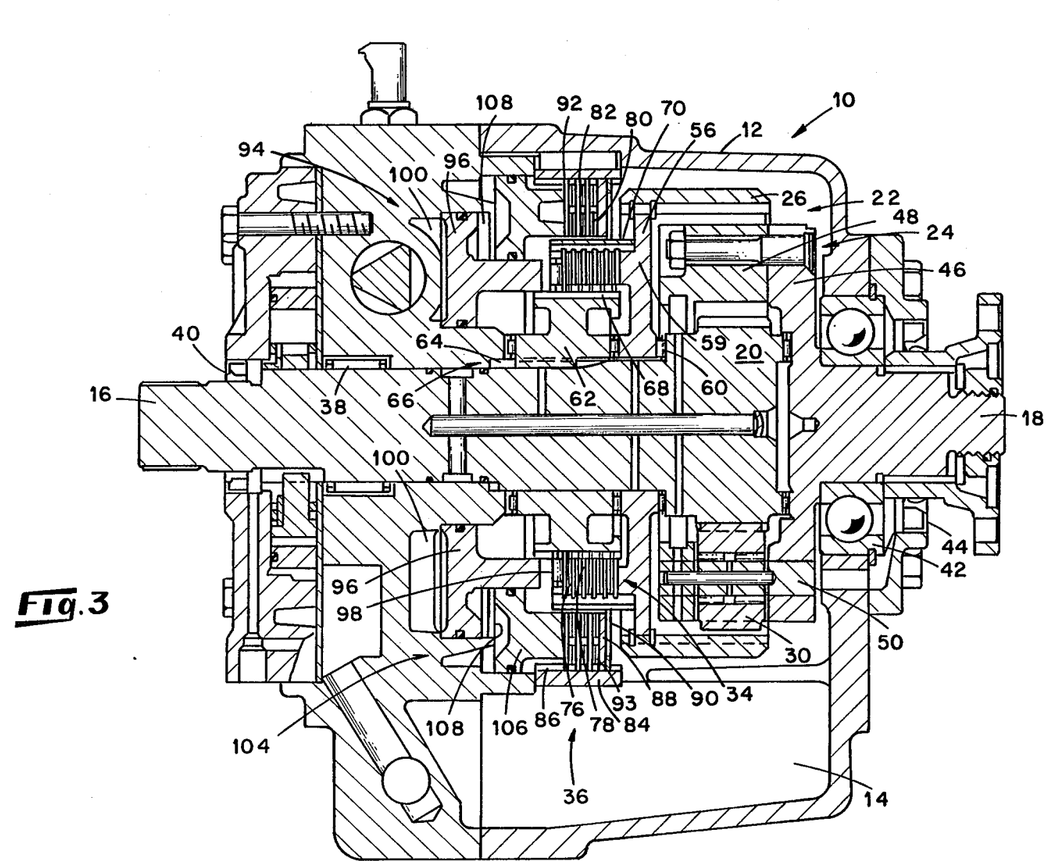
FIG. 3 is a cross-sectional side view of the transmission of FIG. 1, but with the transmission in the reverse driving mode.
Figure 4:
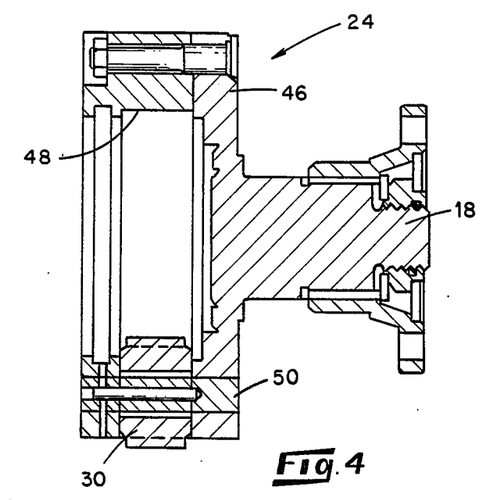
FIG. 4 is a cross-sectional view of the planetary gear carrier of the transmission.
Figure 5:
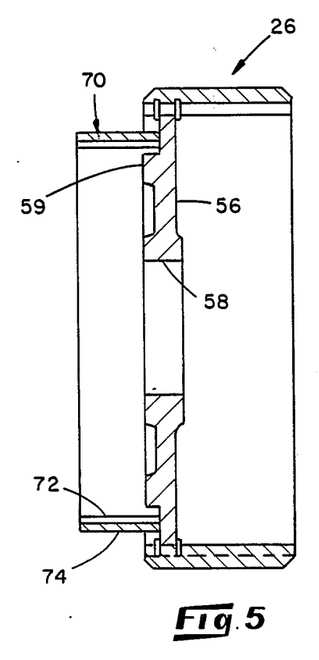
FIG. 5 is a cross-sectional view of a ring gear of the transmission.
Figure 6:
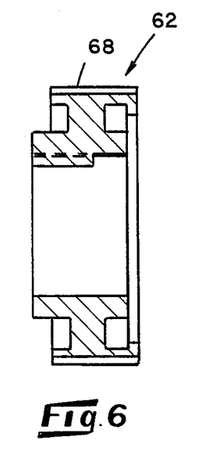
FIG. 6 is a cross-sectional view of a clutch hub of the transmission.

Now with reference to FIGS. 1, 2 and 3, there is shown a reversible transmission device 10 for use in a motor vehicle such as a boat. The reversible transmission device 10 is coupled between the engine and propeller shaft of the vehicle.

The transmission 10 includes a housing 12 having an oil sump 14 in fluid communication with the housing 12. A driving or input shaft 16 is rotatably mounted in the housing 12 and projects from one end thereof to be connected to the vehicle engine. A driven or output shaft 18 is rotatably mounted in the housing 12 and projects from the opposite end of the housing 12 to be connected to the vehicle propeller shaft. As illustrated, the driven shaft 18 is coaxial with the driving shaft 16.

A driving sun gear 20 is concentrically located with the driving shaft 16 and is attached thereto for rotation therewith. The sun gear 20 is located at the end of the driving shaft 16 extending into the transmission housing 10. As shown, the sun gear 20 and driving shaft 16 are of unitary construction.

A planetary gear train 22 couples the driving shaft 16 to the driven shaft 18. The planetary gear train 22 includes a planetary gear carrier 24 concentric with the driving sun gear 20 and mounted coaxially to the driven shaft 18 for rotation therewith, and an outer ring gear 26 concentric with the planetary gear carrier 24. The ring gear 26 is internally toothed. A plurality of sets 28 of first planetary gears 30 and second planetary gears 32 are mounted on the planetary gear carrier 24. The first planetary gears 30 are each in constant mesh with the driving sun gear 20, the second planetary gears 32 are each in constant mesh with the ring gear 26, and the first planetary gear 30 and second planetary gear 32 of each set 28 are in constant mesh with each other. As shown, the first planetary gears 30 are of equal diameter to the second planetary gears 32.

First clutch means 34 is used to selectively couple and uncouple the ring gear 26 to the driving shaft 16 for rotation with the driving shaft 16, and second clutch means 36 is used to concurrently selectively uncouple and couple the ring gear 26 to the transmission housing 12 fixing it against rotation.

The driving shaft 16 is mounted in the housing 12 by means of a front bearing 38 located proximate the end of the driving shaft 16 where it protrudes from the front of the housing 12. A shaft seal 40 seals against oil leakage at the protruding end of the driving shaft 16. The driven shaft 18 is mounted in the transmission housing 12 by means of a bearing 42 located at the end of the driven shaft 18 where it protrudes from the rear end of the housing 12. A shaft seal 44 seals against oil leakage past the driven shaft 18.

With reference to FIGS. 1, 2, 3 and 4, the planetary gear carrier 24 comprises a circular end plate 46 affixed to and radially projecting from the end of the driven shaft 18 extending into the housing 12. As shown, the circumferential end plate 46 is integral with the driven shaft 18. An annular planet gear carriage 48 is attached to the circular end plate 46 by means of fasteners, such as screws, passing through appropriate mating apertures formed in the circular end plate 46 and planet gear carriage 48. As shown best in FIG. 2, there are four planet gear sets 28 mounted in the planetary gear carrier 24. The first planetary gears 30 are rotatably disposed on first planet gear shafts 50 mounted to the planet gear carriage 48. The four first planet gear shafts 50 are disposed in a circular, equally spaced apart array with their longitudinal axes mutually parallel and parallel to the driving shaft 16. The second planetary gears 32 are rotatably disposed on second planet gear shafts 52 mounted to the planet gear carriage 48. The four second planet gear shafts 52 are disposed in a circular, equally spaced apart array with their longitudinal axes mutually parallel, parallel to the first planet gear shafts 50, and parallel to the driving shaft 16. The diameter of the circular array of second planet gear shafts 52 is larger than the diameter of the circular array of the first planet gear shafts 50, and the second planet gear shafts 52 are circumferentially off-set relative to the first planet gear shafts 50 by a dimension generally equal to the pitch diameter of the first and second planetary gears 30 and 32.

As can be best seen in FIGS. 1 and 3, the end of the driving shaft 16 integral of the transmission housing 12 is spaced from the end of the driven shaft 18 internal of the transmission housing 12, and an appropriate thrust bearing 54 is located in the space so that the driving shaft 16 and driven shaft 18 can smoothly rotate in opposite directions relative to each other.

With reference to FIGS. 1, 2, 3 and 5, an annular ring gear plate 56 is located at one end of the ring gear 26 opposite to and generally parallel to the circular end plate 46 of the planetary gear carrier 24. The annular ring gear plate 56 is affixed at its periphery to the ring gear 26 for rotation therewith, and has a central aperture 58 coaxial with the ring gear 26 for receiving the driving shaft 16 therethrough with a clearance fit with the annular plate 56 in juxtaposition to the end of the sun gear 20. The annular ring gear 56 has an annular first clutch contact surface 59 concentric with the central aperture 58. A thrust bearing 60 is located between the ring gear plate 56 and sun gear 20.

With reference to FIGS. 1, 3, 5 and 6, the first clutch means 34 is shown as an axially activated multi-disc type clutch. The first clutch means 34 comprises a clutch hub 62 concentric with the driving shaft 16 spaced from the sun gear 20 longitudinally of the driving shaft 16. The clutch hub 62 is affixed to the driving shaft 16 for rotation therewith. As shown, the clutch hub 62 can be affixed to the driving shaft 16 by means of a key 64 received in a key slot 66 formed in the driving shaft 16. The perimeter of the clutch hub 62 is formed with splines 68 extending generally parallel to the longitudinal axis of the driving shaft 16. A circular clutch ring 70 is attached to the ring gear plate 56 concentric with the central aperture 58. The clutch ring 70 projects from the ring gear plate 56 forwardly or in a direction away from the planetary gear carriage 48 toward the clutch hub 62. The circumference of the clutch ring 70 is larger than the circumference of the clutch hub 62 and concentrically overlays the clutch hub 62 with an annular space therebetween. The first clutch contact surface 59 of the annular ring gear plate 56 is coaxial with and faces this annular space. The clutch ring 70 is formed with internal splines 72 extending generally parallel to the longitudinal axis of the driving shaft 16 and, therefore, parallel to the splines 68 of the clutch hub 62. The clutch ring 70 is also formed with external splines 74 extending generally parallel to the internal splines 72. The first clutch means 34 further includes a plurality of coaxially disposed alternating first friction members, such as annularly shaped clutch plates 76, and second friction members, such as annularly shaped clutch discs 78 which coact to provide a plurality of friction contact surfaces. The first clutch means 34 is disposed in the annular space defined between the clutch hub 62 and clutch ring 70. The annular shaped clutch plates 76, for example, are internally splined and mate with the external splines 68 of the clutch hub 62 for rotation with the clutch hub 62 and relative movement along the splines 68 in the direction of the longitudinal axis of the driving shaft 16. The annular shaped clutch discs 78, for example, are externally splined and mate with the internal splines 72 formed in the clutch ring 70 for rotation with the ring gear 26 and relative movement along the splines 72 in the direction of the longitudinal axis of the driving shaft 16.

With reference to FIGS. 1 and 3, the second clutch means 36 is also an axially activated multi-disc type clutch similar to the first clutch means 34. The second clutch means 36 is comprised of coaxially disposed, alternating first friction members, such as annularly shaped clutch plates 80 and second friction members, such as annularly shaped clutch discs 82 which coact to provide a plurality of friction contact surfaces. The first and second friction members are disposed in an annular space defined between the wall of the transmission housing 12 and the clutch ring 70. An internally splined ring 84 is attached against rotation to the housing wall opposite to and concentric with the clutch ring 70 with the spines 86 of the ring 84 extending generally parallel to the longitudinal axis of the driving shaft 16. The clutch plates 80, for example, are internally splined and mate with the external splines 74 formed in the clutch ring 70 for rotation with the ring gear 26 and relative movement along the splines 74 in the direction of the longitudinal axis of the driving shaft 16. The clutch discs 82, for example, are externally splined and mate with the splines 86 of the ring 84 fixing the clutch discs 82 against rotation and providing movement relative to the wall of the transmission housing 12 along the splines 86 in the direction of the longitudinal axis of the driving shaft 16. The second clutch means 36 further includes a fixed position annular clutch bearing plate 88 located in the annular space between the clutch ring 70 and splined ring 84 at one end of the multi-disc friction clutch members. The clutch bearing plate 88 is fixed against movement along the splines 86 of the splined ring 84 by a snap ring 90. An annular clutch pressure plate 92 is also located in the annular space between the clutch ring 70 and splined ring 84 at the other end of the multi-disc friction clutch members from the clutch bearing plate 88. The clutch pressure plate 92 is externally splined and mates with the splines 86 of the splined ring 84 fixing it against rotation but providing for movement along the splines 86. The second clutch means 36 further includes annular wave springs 93 interposed between the clutch discs 82 to bias the clutch discs 82 away from each other in the direction of the splines 84 of the splined ring 86 and out of contact with the clutch plates 80.

Figure 7:
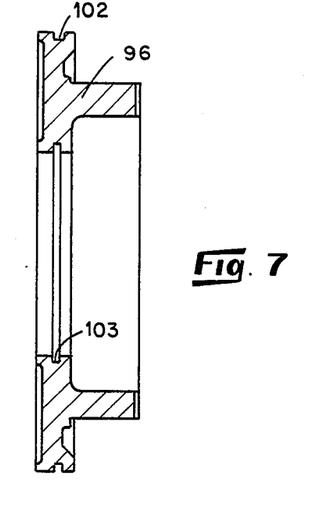
FIG. 7 is a cross-sectional view of an annular first clutch piston of the transmission.

With reference to FIGS. 1, 3 and 7, first hydraulically activated pressure means, generally denoted by the numeral 94, is located in the housing 12 to activate or engage the first clutch means 34. The first hydraulically activated pressure means comprises an annular first piston 96 located in the housing 12 coaxial with the annular space between the clutch hub 62 and clutch ring 70 in alignment with the multi-disc friction members 74 and 76 but to the opposite side thereof from the clutch contact surface 59 on the annular ring gear plate 56. The annular first piston 96 is mounted in the transmission housing 12 against rotation and is adapted to move toward and away from the multi-disc friction members 76 and 78 in the direction of the longitudinal axis of the driving shaft 16. A thrust bearing 98 is located in the annular space defined by the clutch hub 62 and clutch ring 70 between the disc type friction members 76 and 78, and the annular first piston 96. The thrust bearing 98 is mounted for movement in the annular space in the direction of the longitudinal axis of the driving shaft 16. As the annular piston 96 moves toward the disc type friction members 76 and 78, it contacts the thrust bearing 98 pushing the thrust bearing 98 against the friction members 76 and 78 to compress them between the first clutch contact surface 59 of the annular ring gear plate 56 and piston 96 to engage the first clutch means 34.

The first hydraulic activated pressure means 94 also comprises an annular hydraulic reaction chamber 100 formed in the transmission housing 12 coaxial with and open to the annular piston 96. The annular first piston 96 cooperates with the annular chamber 100 to define a closed hydraulic reaction space for hydraulic working fluid working on the annular piston 96. Annular seals 102 and 103 are located on the piston 96 at the annular chamber 100 to seal against the working fluid leaking past the annular piston 96.

Figure 8:
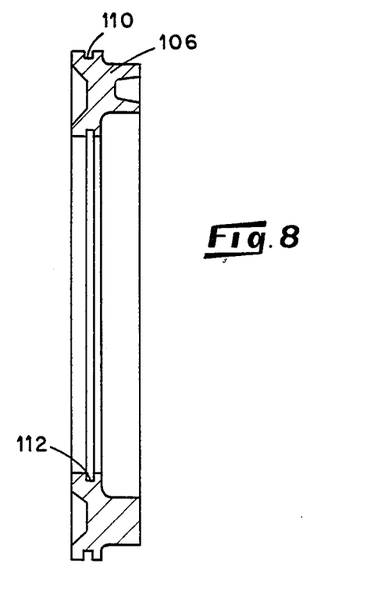
FIG. 8 is a cross-sectional view of an annular second clutch piston of the transmission.

With reference to FIGS. 1, 3 and 8, second hydraulically activated pressure means, generally denoted by the numeral 104, is located in the transmission housing 12 to activate or engage the second clutch means 36. The second hydraulically activated pressure means comprises an annular second piston 106 located in the housing 12 coaxial with the annular space between the clutch ring 70 and splined ring 84 in alignment with the multi-disc friction members 78 and 80 to the opposite side thereof from the annular clutch bearing plate 88. The second piston 106 is concentric with the first piston 96 and, as illustrated, is supported on the first piston 96. The annular second piston 106 is mounted against rotation and is adapted to move toward and away from the multi-disc friction members 80 and 82 in the direction of the longitudinal axis of the driving shaft 16 independent of the annular first piston 96. The first piston 96 and second annular piston 106 cooperate with each other and with the transmission housing 12 to define an annular closed hydraulic reaction chamber 108 therebetween for hydraulic fluid working on both the first piston 96 and second piston 106. An annular seal 110 is located on the external perimeter of the annular second piston 106 to seal against working fluid leakage between the second piston 106 and housing wall, and another annular seal 112 is located on the internal perimeter of the annular second piston 106 to seal against working fluid leakage between the first piston 96 and second piston 106.

With reference to FIG. 1, to shift the transmission 10 into the forward drive mode, the first clutch means 34 is engaged and the second clutch means 36 is simultaneously disengaged. To accomplish this, working fluid is pumped under pressure into the annular hydraulic chamber 100, and the hydraulic pressure of the fluid in the annular chamber 100 moves the annular first piston 96 toward the clutch plates 76 and clutch discs 78 of the first clutch means 34 and against the thrust bearing 98 with sufficient force to move the clutch plates 76 and clutch discs 78 along their splined connections with the clutch hub 62 and clutch ring 70, respectively, and against the first clutch contact surface 59 of the ring gear plate 56. Thus, the clutch plates 76 and clutch discs 78 of the first clutch 34 are compressively sandwiched between the annular first piston 96 and first clutch contact surface 59 causing the alternating clutch plates 76 and clutch discs 78 to frictionally engage with one another so that there is no relative movement therebetween and the first clutch means 34 is engaged. The second clutch means 36 remains disengaged because the closed hydraulic reaction chamber 108 is void of hydraulic fluid so that the wave springs 93 of the second clutch means 36 keeps the annular clutch plates 80 and annular clutch discs 82 out of mutual frictional engagement. Due to the splined engagement of the clutch plates 76 to the clutch hub 62, and the splined engagement of the clutch discs 78 with the clutch ring 70, the planet ring gear 26 is locked or coupled to the driving shaft 16 for rotation therewith. Thus, the planet ring gear 26 and sun gear 20 rotate together in the same angular direction and at the same angular velocity. There being no relative rotation between the ring gear 26 and sun gear 20, the planetary gears 30 and 32 do not rotate about their respective shafts 50 and 52 so that the planetary gear carrier 24 rotates with the sun gear 20 and ring gear 26 in the same angular direction and same angular velocity. The driven shaft 18 being affixed to the planetary gear carrier 24 therefore rotates with the gear carrier 24 in the same angular direction and at the same angular velocity. Therefore, the driven shaft 18 rotates in the same angular direction and at the same angular velocity as the driving shaft 16.

Now with reference to FIG. 3, to shift the transmission 10 into the reverse drive mode, the first clutch means 34 is disengaged and the second clutch means 36 is simultaneously engaged. To accomplish this, working fluid is removed from the annular hydraulic chamber 100 relieving the hydraulic pressure which forces the annular first piston 96 toward the friction members 76 and 78, and hydraulic fluid is concurrently pumped under pressure into the hydraulic reaction chamber 108 between the annular first piston 96 and annular second piston 106. The hydraulic pressure in the reaction chamber 108 concurrently moves the annular first piston 96 away from the clutch plates 76 and clutch discs 78 of the first clutch means 34 and moves the annular second piston 106 toward the clutch plates 80 and clutch discs 82 of the second clutch means 36. When the first annular piston 96 moves out of contact with the clutch discs 76 and clutch plates 78, the compressive force sandwiching them together into mutual frictional contact is relieved so that there now can be relative rotation movement therebetween and, thus, relative rotational movement between the clutch hub 62 and clutch ring 70. The annular second piston 106 moves toward the clutch plates 80 and clutch discs 82 of the second clutch means 36 and against the clutch pressure plate 92 with sufficient force to overcome the biasing force of the wave springs 93 to move the clutch plates 80 and clutch disc 82 along their splined connections with the clutch ring 70 and splined ring 84, and against the annular clutch bearing plate 88. Thus, the clutch plates 80 and clutch discs 82 of the second clutch means 3 are compressively sandwiched between the annular clutch bearing plate 88 and annular clutch pressure plate 92 causing the alternating clutch plates 80 and clutch discs 82 to frictionally engage with one another so that there is no relative movement therebetween and the second clutch means 36 is engaged. Due to the splined engagement of the clutch plates 80 to the clutch ring 70, and the splined engagement of the clutch discs 82 with the splined ring 84, the planet ring gear 26 is locked or coupled to the transmission housing 12 against rotation. Thus, as the sun gear 20 is rotated in one angular direction with the driving shaft 16, for example clockwise, the first planetary gears 30 are caused to rotate in a counter clockwise direction about their first planetary gear shafts 50. The first planetary gears 30 being in mesh with the second planetary gears 32 cause the second planetary gears 32 to rotate about their second planetary gear shafts 52 in a clockwise direction. Because the ring gear 26 is held stationary, the clockwise rotation of the second planetary gears 32 in mesh with the stationary ring gear 26 causes the planetary gear carrier 24 to rotate in a counter-clockwise direction. The driven shaft 18 being affixed to the planetary gear carrier 24 therefore rotates with the gear carrier 24 in the same angular direction. Thus, the driven shaft 18 is caused to rotate in the opposite rotational direction from the driving shaft 16.

In order to shift the transmission 10 into the neutral mode, hydraulic fluid is removed from both the annular chamber 100 behind the first annular piston 96 and the annular chamber 108 between the annular first piston 96 and annular second piston 106 thusly disengaging both the first clutch 34 and second clutch 36 allowing the driving shaft 16 to rotate freely without transmitting power to the driven shaft 18.

Various valves (not shown) known to the field of hydraulics can be used to route hydraulic working field to and from the hydraulic chamber 100 ad hydraulic chamber 108. The valve control can be positioned at the driver? s position or helm of the boat to be conveniently manually operated by the driver of the motor vehicle.

The foregoing detailed description is given primarily for clearness of understanding and no unnecessary limitations are to be understood therefrom for modifications will become obvious to those skilled in the art upon reading this disclosure and can be made without departing from the spirit of the invention or scope of the appended claims.

We claim:

1. A reversible transmission for use with a motor vehicle comprising:

a housing;

a driving shaft rotatably mounted within said housing;

a planetary gear train having a sun gear rotatably driven by said driving shaft, first planetary gears in meshing engagement with said sun gear, second planetary gears in meshing engagement with said first planetary gears, a planetary gear carrier for holding said first planetary gears and said second planetary gears in position about said sun gear, and a ring gear surrounding said planetary gear carrier in meshing engagement with said second planetary gears;

a driven shaft rotatably mounted in said housing and driven by said planetary gear carrier; and means for selectively interconnecting said ring gear to said driving shaft for rotation therewith in the same angular direction whereby said driven shaft is given in the same angular direction as said driving shaft or interconnecting said ring gear to said housing against rotation whereby said driven shaft is driven in the opposite angular direction from said driving shaft, said means for selectively interconnecting including a hydraulic system having a pair of annular pistons mounted within said housing for linear movement relative thereto and prevented from rotating relative to the housing and having a pair of reaction chambers associated with the housing for holding hydraulic fluid wherein each reaction chamber is in communication with a corresponding one of the pistons, a first of said pistons adapted to move linearly with respect to the housing for interconnecting said ring gear to said driving shaft in response to the application of hydraulic pressure applied to said first piston from a first of said reaction chambers, and a second of said pistons adapted to move linearly with respect to said housing for interconnecting said ring gear to said housing in response to the application of hydraulic pressure applied to said second piston from a second of said reaction chambers so that neither the pistons, reaction chambers nor hydraulic fluid held in the reaction chambers are exposed to centrifugal forces during a drive mode of the transmission during which said ring gear is interconnected to said driving shaft or said housing.

2. The reversible transmission of claim 1, wherein said means for selectively interconnecting said ring gear to said driving shaft or interconnecting said ring gear to said housing comprises:

first clutch means associated with said first piston for selectively interconnecting said ring gear to said driving shaft; and second clutch means associated with said second piston for alternatively selectively interconnecting said ring gear to said housing.

3. The reversible transmission of claim 2, wherein:

(a) said first clutch means includes:

first coacting friction members intermediate said ring gear and said driving shaft and adapted to frictionally engage one another in response to the linear displacement of said first piston relative to said housing beyond a predetermined extent; and (b) said second clutch means includes second coating friction members intermediate said ring gear and said housing and adapted to frictionally engage one another in response to the linear displacement of said second piston relative to said housing beyond a preselected extent.

4. The reversible transmission of claim 3, wherein:

said first piston is moved toward said coacting friction members of said first clutch as hydraulic pressure in said first reaction chamber is increased and moved away from said coacting friction members of said first clutch as hydraulic pressure in said second reaction chamber is increased; and said second piston is moved toward said coacting friction members of said second clutch as hydraulic pressure in said second reaction chamber is increased.

5. The reversible transmission of claim 3, further comprising biasing means for moving said second piston toward a position relative to said housing so that said coacting friction members of said second clutch move out of frictional engagement.

6. The reversible transmission of claim 3, wherein said second reaction chamber is common to both said first piston and said second piston which when pressurized with a hydraulic fluid concurrently moves to said first piston out of position at which said coacting friction members of said first clutch frictionally engage one another and moves said second piston toward a position at which said coacting members of said second clutch frictionally engage one another.

7. The reversible transmission of claim 6, further comprising biasing means for moving said second piston out of a position at which said coacting friction members of said second clutch engage one another when said second reaction chamber is depressurized.

8. The reversible transmission of claim 3, wherein said second piston is mounted on said first piston for movement relative thereto toward and away from said coacting friction members of said second clutch as said first piston moves away from and toward, respectively, said coacting friction members of said first clutch.

9. The reversible transmission of claim 1, further comprising means providing a full neutral mode wherein said means for selectively interconnecting said ring gear to said driving shaft and interconnecting said ring gear to said housing is disengaged from both functions.

10. A transmission for use with a motor vehicle comprising:

a housing;

a driving shaft mounted in said housing;

a driven shaft mounted in said housing;

a first power path for interconnecting said driving shaft to said driven shaft for rotating said driven shaft in the same direction as said driving shaft and providing a first drive mode;

a second power path for interconnecting said driving shaft to said driven shaft for rotating said driven shaft in a second drive mode that is different from said first drive mode;

first clutch means for selectively engaging and disengaging said first power path;

second crutch means for selectively engaging and disengaging said second power path; and stationary pressure means associated with said housing for selectively applying pressure to either one of said first and second clutch means for selectively operating said transmission in either one of the first or second drive modes, said stationary pressure means including first and second annular pistons mounted within said housing for linear movement relative thereto and prevented from rotating relative to the housing and first and second cylinder means associated with the housing for holding hydraulic fluid wherein the first cylinder means is in communication with said first piston and said second cylinder means is in communication with said second piston, said first piston cooperable with said first clutch means and adapted to move linearly with respect to said housing for engaging said first power path in response to the application of hydraulic pressure applied to said first piston from the first cylinder means, and said second piston cooperable with said second clutch means and adapted to move linearly with respect to said housing for engaging said second power path in response to the application of hydraulic pressure applied to said second piston from the second cylinder means so that neither the pistons, cylinder means nor hydraulic fluid held in the cylinder means is exposed to centrifugal forces during the first and second drive modes.

11. The transmission of claim 10 wherein roller means are disposed between said stationary pressure means and at least one of said clutch means.

12. The transmission of claim 10, wherein said:

second cylinder means is formed at least in part by said first piston and disposed generally between said first piston and said first clutch means so that pressurized hydraulic fluid within said second cylinder means urges said first piston away from said first clutch means; and said transmission further comprises:

a hydraulic system for selective supplying pressurized hydraulic fluid to and releasing pressurized hydraulic fluid from said first and second cylinder means; and said second cylinder means being configured to simultaneously urge said second piston toward a position at which said second clutch means engages said second power path and urge said first piston away from a position at which said first clutch means engages said first power path when hydraulic pressure is applied to said second cylinder means.

13. The transmission of claim 10 further comprising spring means for urging at least one of said clutch means to disengage.

14. The transmission of claim 10 wherein at least one of said clutch means comprises:
   a plurality of annular clutch discs splined to the housing;
   a plurality of annular clutch plates mechanically connected to rotate with one of said drive trains;
   said plates and discs being stacked with each clutch disc being disposed between said clutch plates; and
   spring means for biasing said clutch plates and discs apart.

15. The transmission of claim 14 wherein said spring means comprises a plurality of wave springs operating between said clutch plates and being operable to force said clutch plates apart and out of contact with said clutch discs when said pressure means is not applying pressure to said clutch means.

16. A transmission for use with a motor vehicle comprising:
   a housing;
   a driving shaft mounted in said housing;
   a driven shaft mounted in said housing;
   a first power path for interconnecting said driving shaft to said driven shaft for rotating said driven shaft in the same direction as said driving shaft and providing a first drive mode;
   a second power path for interconnecting said driving shaft to said driven shaft for rotating said driven shaft in a second drive mode that is different from said first drive mode;
   first clutch means for selectively engaging and disengaging said first power path;
   second clutch means for selectively engaging and disengaging said second power path; and
   stationary pressure means mounted in said housing for selectively applying pressure to either one of said first and second clutch means for selectively operating said transmission in either one of the first and second drive modes, said pressure means including
   a first annular cylinder formed in said housing;
   a first annular piston disposed for axial movement in said first annular cylinder;
   a cylindrical ring protruding from said annular piston toward said first clutch means;
   housing surface means including an outer cylindrical surface that is disposed coaxially around said cylindrical ring, said housing surface being configured to define a second annular cylinder in which one wall of said second annular cylinder is formed by said cylindrical ring and another wall is formed by said outer cylindrical surface of said housing surface means;
   a second annular piston disposed within said second annular cylinder engaging and sliding along said outer cylindrical surface and said cylindrical ring in an axial direction and being disposed to selectively engage said second clutch means; and
   a hydraulic system for selectively introducing pressurized fluid into and releasing pressurized fluid from said first and second cylinders whereby said first and second pistons are selectively forced against said first and second clutch means, respectively, and whereby the introduction of pressurized fluid into said second cylinder is operable to urge said first piston away from said first clutch means and said second piston toward said second clutch means.

* * * * *